United States Patent
Sunaga et al.

(10) Patent No.: US 9,186,827 B2
(45) Date of Patent: Nov. 17, 2015

(54) RESIN PISTON AND METHOD FOR MOLDING RESIN PISTON

(75) Inventors: Isao Sunaga, Tokyo (JP); Daigo Kawabata, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 480 days.

(21) Appl. No.: 13/010,604

(22) Filed: Jan. 20, 2011

(65) Prior Publication Data

US 2011/0174154 A1    Jul. 21, 2011

(30) Foreign Application Priority Data

Jan. 20, 2010    (JP) .................................. 2010-010329

(51) Int. Cl.
| | | |
|---|---|---|
| B23P 15/00 | (2006.01) | |
| B29C 43/36 | (2006.01) | |
| B29C 33/20 | (2006.01) | |
| B29C 43/50 | (2006.01) | |
| B29K 105/00 | (2006.01) | |

(52) U.S. Cl.
CPC .............. B29C 43/36 (2013.01); *B29C 33/20* (2013.01); *B29C 2043/3615* (2013.01); *B29C 2043/3628* (2013.01); *B29C 2043/503* (2013.01); *B29K 2105/251* (2013.01)

(58) Field of Classification Search
CPC .. B29C 43/34; B29C 33/0055; B29C 33/0033
USPC .......................... 264/319, 322, 323, 40.5, 161; 29/888.04; 425/412–423
See application file for complete search history.

(56) References Cited

U.S. PATENT DOCUMENTS

| | | | | | |
|---|---|---|---|---|---|
| 2,032,869 | A | * | 3/1936 | Cobb ............................ | 425/401 |
| 2,710,991 | A | * | 6/1955 | Hannah et al. ................ | 264/113 |
| 3,670,066 | A | * | 6/1972 | Valyi ............................. | 264/148 |
| 4,243,620 | A | * | 1/1981 | Curetti et al. ................ | 264/45.1 |
| 4,324,541 | A | * | 4/1982 | Curetti et al. ................ | 425/562 |
| 4,370,121 | A | * | 1/1983 | Valyi ............................. | 425/526 |
| 4,529,372 | A | * | 7/1985 | Saumsiegle .................. | 425/528 |
| 5,160,749 | A | * | 11/1992 | Fogarty ........................ | 425/412 |
| 5,204,127 | A | * | 4/1993 | Prusha .......................... | 425/544 |
| 5,762,854 | A | * | 6/1998 | Valyi ............................. | 264/255 |
| 2006/0231978 | A1 | * | 10/2006 | Beltrandi et al. ............ | 264/319 |
| 2008/0315460 | A1 | * | 12/2008 | Kusano et al. ................ | 264/346 |
| 2009/0008810 | A1 | * | 1/2009 | Parrinello et al. ............ | 264/40.5 |

FOREIGN PATENT DOCUMENTS

| | | | | |
|---|---|---|---|---|
| JP | A-S56-161137 | | 12/1981 | |
| JP | 06238676 | A * | 8/1994 | |
| JP | A-H07-314477 | | 12/1995 | |
| JP | 08-300430 | | 11/1996 | |
| JP | 2005-035077 | | 2/2005 | |

* cited by examiner

*Primary Examiner* — Jacob Cigna
(74) *Attorney, Agent, or Firm* — Drinker Biddle & Reath LLP

(57) ABSTRACT

In a method for molding a resin piston by charging a preheated resin tablet into a cavity of a molding die, and by carrying out compression molding while heating, at a time point when an internal pressure of the cavity arrives at a determined pressure, by pressurizing a pressurizing margin in the molding die, resin which overflows from the molding die is discharged from a passage which is defined in an area except an outer circumferential surface of the piston, while the internal pressure of the cavity is maintained. After a thermosetting cycle has finished, the molding die 21 is opened.

2 Claims, 3 Drawing Sheets

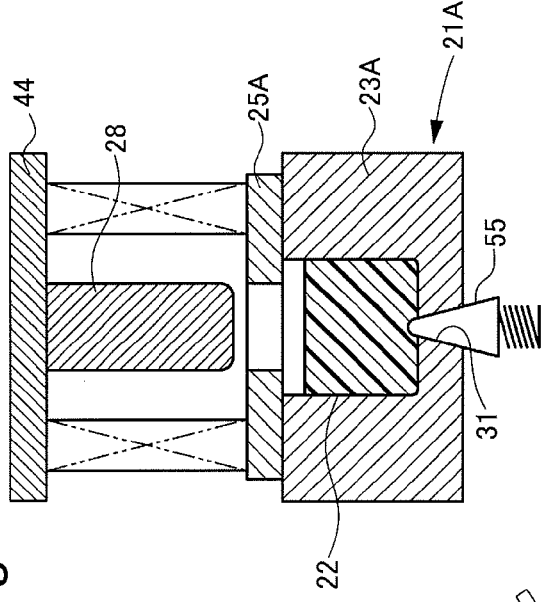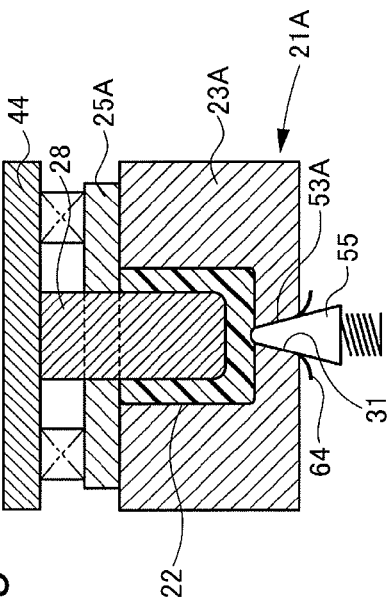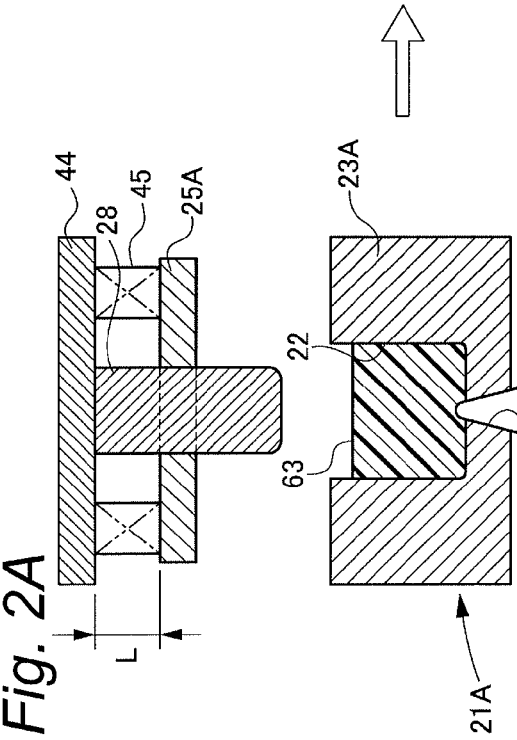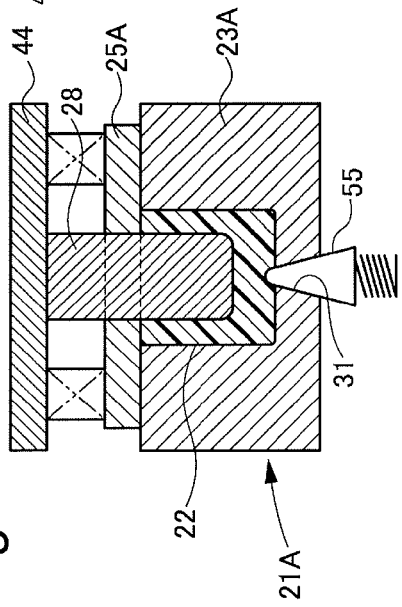

RESIN PISTON AND METHOD FOR MOLDING RESIN PISTON

BACKGROUND

The present invention is related to a method for molding a resin piston which is used, for example, in a disc brake device of a vehicle, and the resin piston.

Conventionally, a resin piston which is used in a disc brake device of a vehicle is usually produced by compression molding method, for the purpose of increasing packing density of material thereby to secure mechanical strength.

FIGS. 3A to 3D show a conventional production method for forming a resin piston by compression molding. This production method is similar to a resin molding method which is disclosed in Patent Document 1.

A molding die 1 to be used in the compression molding includes a lower die 2, and an upper die 3 capable of moving up and down with respect to the lower die 2.

In a production of the resin piston, as a first step, a resin tablet 5 as thermosetting resin material in a preheated state is charged into a cavity 4 in the lower die 2, as shown in FIG. 3A. Then, the upper die 3 is moved down toward the lower die 2, as shown in FIG. 3B, and a pressure punch 6 which is integrally provided with the upper die 3 is pushed into the cavity 4 thereby to crush the resin tablet 5. As downward movement of the upper die 3 proceeds, a part of the resin tablet 5 in the cavity 4 overflows to a passage 9 which is defined between an upper surface 7 of the lower die and a lower surface 8 of the upper die around an outer circumference of the cavity, as shown in FIG. 3C.

In a situation where the resin tablet 5 is discharged to the passage 9 as shown in FIG. 3C, a gap between the lower surface 8 of the upper die and the upper surface 7 of the lower die is gradually made narrow thereby to restrain a flow of the material, and hence, pressure in the cavity 4 is gradually increased. When the upper die 3 is moved down up to a final pressurizing margin, as shown in FIG. 3D, an internal pressure of the cavity arrives at a setting pressure. In this situation, a sectional area of an opening of the passage 9 is reduced up to a prescribed value, and the resin is restrained from flowing to the passage 9, and hence, the internal pressure of the cavity is maintained. Moreover, in this situation, the passage 9 is not completely closed for realizing discharge of superfluous resin material, and kept communicated with the cavity 4.

In the state as shown in FIG. 3D, a thermosetting process for thermosetting the resin material in the cavity 4 is carried out in the molding die 1 which has been warmed by heating to a predetermined temperature, in advance. Then, the thermosetting process is carried out to such an extent that there occurs no dimensional change after a molded product is taken out from the molding die, and thereafter, the molding die 1 is opened to take out the molded product.

On occasion of thermosetting the resin material in the cavity 4, the heating is usually conducted by heating the molding die 1 from outside to raise the temperature, and therefore, it is difficult to efficiently heat the material inside the mold.

In view of the above, there is proposed, in Patent Document 1, a compression molding method for realizing reduction of time required for thermosetting process of the resin, by adding a high frequency induction heating coil to the molding die.

There is also proposed, in Patent Document 2, a method for molding a resin piston, by charging a preheated resin tablet into a cavity of a molding die, and by compression molding the resin tablet while heating, wherein a mold is closed in such a state that a movable core for forming a concave of the resin piston retreats by a certain distance from a determined position for constituting a final shape of a molded product of a brake piston, the resin is injected and charged into the cavity from a communicating passage which communicates between an outer circumference of the cavity and an injection gate, a gate seal pin is advanced to the communicating passage thereby to seal the gate, and thereafter, the movable core is advanced to the determined position thereby to form the final shape of the molded product.

In the compression molding method disclosed in Patent Document 2, an injection molding method is combined with the compression molding method. By combining the methods in this manner, it is possible to add such advantages of the injection molding method that the resin material can be easily charged, and even a complicated shape can be molded, to the compression molding method.

In case of the conventional compression molding method similar to Patent Document 1, as shown in FIGS. 3A to 3D, the passage 9 for discharging the superfluous resin material is made narrow, and sliding resistance of the resin material is enhanced, while the pressure in the cavity is maintained, thereby to secure density in the mold. However, because the molding die is not completely closed, it is difficult to restrain flow of the resin material, which leads to an increase of waste resin material.

Further, the resin material 11 which has flowed out to the passage 9 is left as a burr, on an outer circumferential surface of the resin piston obtained as the molded product, and an additional working step for removing this burr is required. Therefore, there is also such a problem that an increase of cost is incurred.

On the other hand, in the compression molding method disclosed in Patent Document 2, the resin material is charged into the cavity from the injection gate, and therefore, such a large burr as occurring in case of the conventional compression molding method does not occur on the outer circumference of the resin piston as the molded product.

However, because the injection gate is communicated with the outer circumference of the cavity, a mark of the injection molding gate is left on the outer circumferential surface of the resin piston which is the molded product. Accordingly, an additional working step for removing the gate mark such as cylindrical grinding is necessary, and there is also such a problem that the additional working step incurs an increase of cost.

[Patent Document 1] Japanese Patent Publication No. 2005-035077

[Patent Document 2] Japanese Patent Publication No. H08-300430

SUMMARY

One of advantageous aspects of the present invention is to provide a method for molding a resin piston in which waste resin material can be reduced, and additional working steps such as cylindrical grinding can be made unnecessary, and the resin piston.

According to one of the advantageous aspects of the invention, there is provided a method for molding a resin piston by charging a preheated resin tablet into a cavity of a molding die, and by compression molding the resin tablet while heating, the method comprising:

a step for discharging resin which overflows from the molding die, from a passage which is defined in an area except an outer circumferential surface of the resin piston, while maintaining an internal pressure of the cavity, when a pressurizing margin in the molding die is pressurized and the internal pressure of the cavity arrives at a setting pressure; and a step for opening the molding die, after a thermosetting cycle is finished.

The molding die may include at least an upper die, a lower die, and a pressure punch which is passed through the upper die to be fitted into the cavity which is formed by the upper die and the lower die.

The passage may be defined on a sliding surface between the pressure punch and the upper die.

The passage may be defined on a lower surface which is a hydraulic pressure acting surface of the resin piston.

The passage may be commonly used as a passage for inserting an ejector pin.

According to another advantageous aspect of the invention, there is provided a resin piston which is produced by the method for molding a resin piston as described above.

BRIEF DESCRIPTION OF DRAWINGS

FIG. 2A is a schematic view showing a state where a molding die is opened, in a compression molding process in a second embodiment according to the invention.

FIG. 2B is a schematic view showing a state where an upper die is closed, in the compression molding process in the second embodiment according to the invention.

FIG. 2C is a schematic view showing a state where a compression molding step is carried out in the compression molding process in the second embodiment according to the invention.

FIG. 2D is a schematic view showing a state where superfluous resin is discharged during the compression molding step, in the compression molding process in the second embodiment according to the invention.

DETAILED DESCRIPTION OF EXEMPLIFIED EMBODIMENTS

Figure 1A:
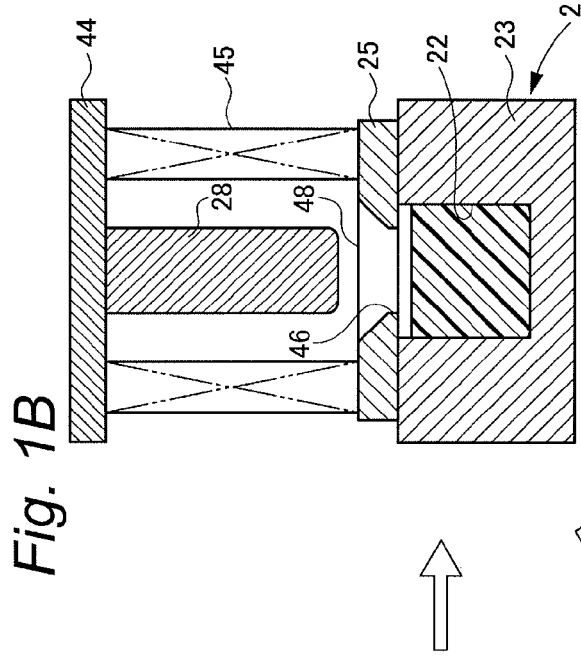
FIG. 1A is a schematic view showing a state where a molding die is opened, in a compression molding process in a first embodiment according to the invention.

A method for molding a resin piston and the resin piston in the embodiments according to the invention will be described in detail, referring to the drawings.

Figure 1B:
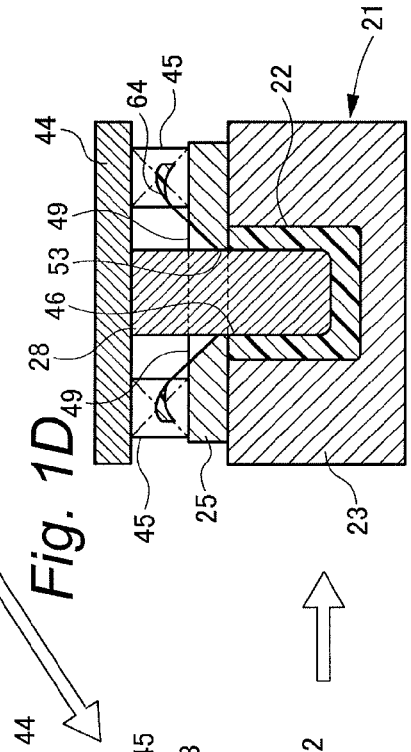
FIG. 1B is a schematic view showing a state where an upper die is closed, in the compression molding process in the first embodiment according to the invention.
Figure 1C:
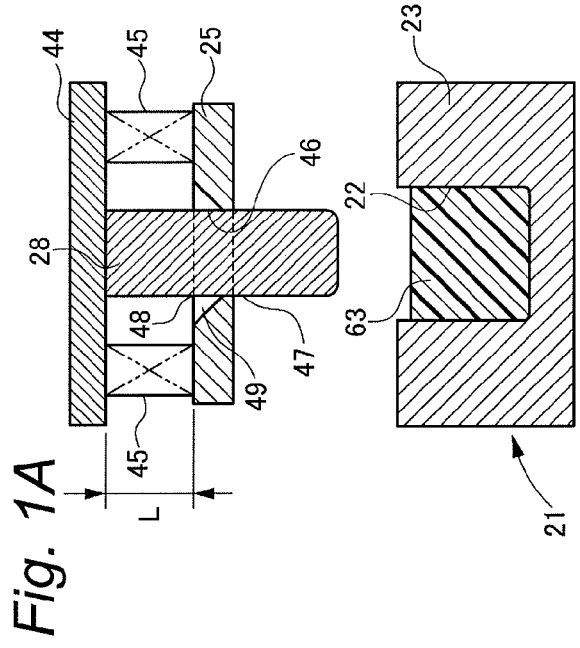
FIG. 1C is a schematic view showing a state where a compression molding step is carried out in the compression molding process in the first embodiment according to the invention.
Figure 1D:
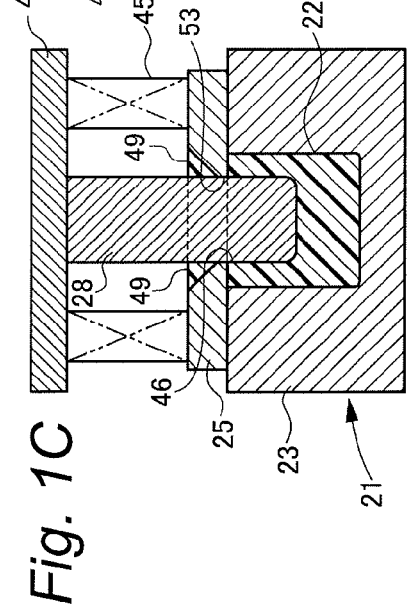
FIG. 1D is a schematic view showing a state where superfluous resin is discharged during the compression molding step, in the compression molding process in the first embodiment according to the invention.
Figure 3A:
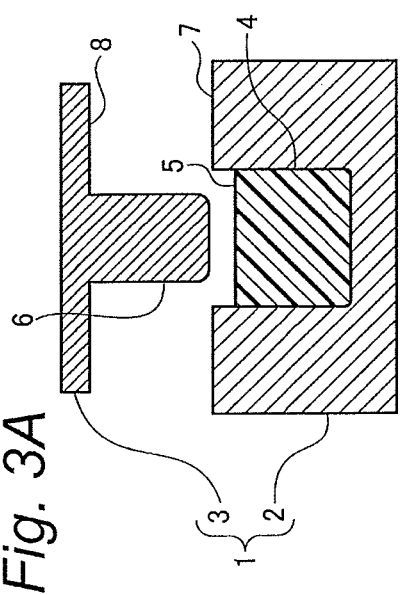
FIGS. 3A to 3D are schematic views showing steps in a conventional method for molding a resin piston.
Figure 3B:
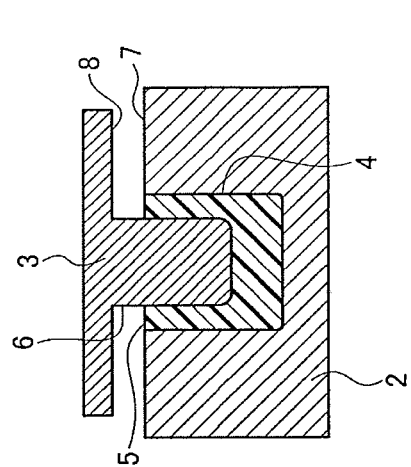
Figure 3C:
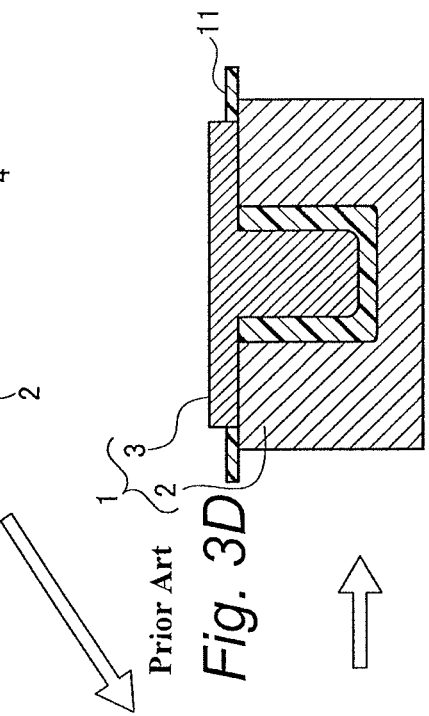
Figure 3D:
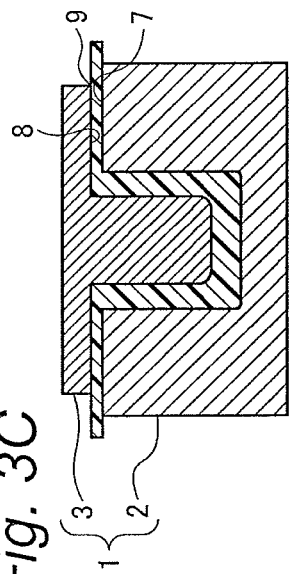

FIGS. 1A to 1D are schematic views showing a series of compression molding steps in a first embodiment according to the invention. FIG. 1A is a vertical sectional view in a state where an upper die and a lower die are opened. FIG. 1B is a vertical sectional view in a state where the upper die and the lower die are closed. FIG. 1C is a vertical sectional view in a state where the compression molding is started by means of a pressure punch. FIG. 1D is a vertical sectional view in a state where an internal pressure is adjusted to a determined pressure range with compression by the pressure punch.

A molding die 21 which is used in the first embodiment includes a lower die 23 having a cavity 22, an upper die 25 which is provided above the lower die 23 so as to move up and down and adapted to close the cavity 22, a pressure punch 28 which passes through the upper die 25 in such a manner that a distal end thereof can enter into the cavity 22, and an ejector pin (not shown) which passes through the lower die 23 to be inserted into the cavity 22 for taking out a molded product from the cavity 22.

Moreover, the molding die 21 is provided with heating means (not shown) for heating the molds to a predetermined temperature for thermosetting process. Desirably, the heating means may include high frequency dielectric heating or microwave heating for the purpose of uniformly heating a resin tablet in a short time.

The lower die 23 is formed as a block body which is open upward having the cavity 22 formed therein. In a center part of this block body, there is formed a knockout hole (not shown) for allowing the above mentioned ejector pin to be inserted into the cavity 22.

The upper die 25 is formed as a block body which is pressed onto the lower die 23 thereby to close the cavity 22.

The upper die 25 is fitted to a punch mounting plate 44 which is separated upward from the upper die 25 by a distance L, as shown in FIG. 1A, by way of a movable support member 45 which applies elasticity to the punch mounting plate 44. The movable support member 45 is a member for elastically support the upper die 25 so as to be displaced in a direction separating from the punch mounting plate 44. For example, a compression spring or an actuator such as an air cylinder may be used as the movable support member 45.

The punch mounting plate 44 is supported by a press mechanism (not shown) so as to move up and down with respect to the lower die 23. Therefore, in the molding die 21 in this embodiment, the upper die 25 moves up and down with respect to the lower die 23 along with the upward and downward movements of the punch mounting plate 44 by operation of the press mechanism.

After a lower surface of the upper die 25 comes into tight contact with an upper surface of the lower die 23 by the downward movement of the punch mounting plate 44, and the cavity 22 is brought into a closed state, the punch mounting plate 44 can further move downward according to an amount reduced from the original separation distance L between the upper die 25 and the punch mounting plate 44.

On this occasion, the separation distance between the upper die 25 and the punch mounting plate 44 is gradually reduced along with the downward movement of the punch mounting plate 44. However, because the movable support member 45 presses the upper die 25 against the lower die 23, a determined tight contact pressure is maintained between the upper die 25 and the lower die 23. The tight contact pressure acts as a force for closing the molds.

The pressure punch 28 is passed through the upper die 25, and assembled to the punch mounting plate 44 in a fixed manner. In an initial state of this assembly, the original separation distance L is secured between the upper die 25 and the punch mounting plate 44, as shown in FIG. 1A, and a distal end surface of the pressure punch 28 protrudes from the lower surface of the upper die 25 by a certain length.

Moreover, in a state where the separation distance between the upper die 25 and the punch mounting plate 44 is reduced by compression of the movable support member 45, as shown in FIG. 1D, the distal end surface of the pressure punch 28 remarkably protrudes from the lower surface of the upper die 25, and the protruding distal end part enters into the cavity 22. The distal end part of the pressure punch 28 which has entered into the cavity 22 compresses a resin tablet 63 in the cavity 22. Specifically, the separation distance L between the upper die 25 and the punch mounting plate 44 is set as an equivalent to a pressurizing margin to be pressurized by the pressure punch 28.

Although a specific mechanism is not shown, the separation distance L between the upper die 25 and the punch mounting plate 44 can be adjusted according to property of the resin material, a shape of the molded product, etc.

In case of this embodiment, a punch passing hole 46 for allowing the pressure punch 28 to pass through is formed through the upper die 25. An inner circumferential surface of the punch passing hole 46 is formed as a sliding surface for slidably holding the pressure punch 28, and a diameter of the hole is set to be a size nearly equal to an outer diameter of the pressure punch 28. Moreover, an upper end opening 48 of the punch passing hole 46 is set to be larger than the outer diameter of the pressure punch 28 so as to define a space 49 having an adequate size with respect to the pressure punch 28.

In order to secure a passage 53 (See FIG. 1C) for discharging superfluous resin material to the space 49, when the pressure punch 28 compresses the resin material in the cavity 22, a tolerance is set in clearance fit between the sliding surface near a lower end opening 47 of the punch passing hole 46 and the pressure punch 28.

The aforesaid space 49 serves as a space for storing the resin which flows from a gap between the lower end opening 47 and the pressure punch 28.

Then, a method for molding the resin piston using the above described molding die 21 will be described.

As a first step, a preheated resin tablet (a block of the resin material) 63 is charged into the cavity 22 of the lower die 23 which is kept warm by heating to the predetermined temperature in advance, as shown in FIG. 1A. Then, the upper die 25 is moved downward to close the cavity 22, as shown in FIG. 1B. In a state where the upper die 25 is pressed against the lower die 23 by an urging force of the movable support member 45, the punch mounting plate 44 is further moved downward to insert the pressure punch 28 into the cavity 22, and thus, the compression molding is started.

When the pressure punch 28 is inserted into the cavity 22, superfluous resin material overflows to the space 49 from the passage 53 which is secured between the pressure punch 28 and the lower end opening (the sliding surface) 47 of the punch passing hole 46. Moreover, as the pressure punch 28 proceeds into the cavity 22, the pressure in the cavity is gradually increased.

Then, the punch mounting plate 44 is moved downward up to a prescribed pushing position, as shown in FIG. 1D. When the pressure punch 28 is inserted into the cavity 22 up to a final molding position, pressurization by a determined pressurizing margin is completed in the cavity 22, and the internal pressure of the cavity arrives at the determined pressure. At this arrival at the determined pressure, the resin material is completely filled in the cavity 22.

Moreover, at a time point when the internal pressure of the cavity has arrived at the determined pressure, the thermosetting process is carried out keeping the temperature of the molding die 21 at the temperature required for thermosetting the resin material, while the internal pressure of the cavity is kept within the determined pressure range. During this thermosetting process, the superfluous resin material 64 is guided out to the space 49 from the passage 53 which is secured on the sliding surface between the punch passing hole 46 and the pressure punch 28, and packing density in the cavity 22 is adjusted to the packing density which has been set.

After the thermosetting process (thermosetting cycle) has finished, the molding die 21 is opened, and the ejector pin, which is not shown, is inserted into the hole in the lower die 23 thereby to take out the molded product from the cavity 22.

In the method for molding the resin piston as described above, the resin which overflows from the cavity 22 of the molding die 21 in the compression molding step is discharged from the passage 53 which is provided on the sliding surface of the pressure punch 28 corresponding to an area of the piston except an outer circumferential surface thereof. Accordingly, there is no burr formed by the resin which is discharged, on the outer circumferential surface of the piston which is in sliding contact with a cylinder. Besides, because an injection gate is not used in charging the material into the cavity 22, a gate mark will not occur.

Therefore, it becomes unnecessary to apply additional works such as removal of the burr, removal of the gate mark, to the outer circumferential surface of the piston. Further, the passage 53 for discharging the resin which overflows from the cavity 22 can be made in a substantially closed state, and hence, it is also possible to decrease waste resin material.

Moreover, because the molding die 21 is opened after the thermosetting cycle has finished, dispersion in size hardly occurs in the molded products, and stabilized products having high dimensional accuracy can be obtained.

Specifically describing, in the method for molding the resin piston in the above described first embodiment, the molding die 21 is provided with the upper die 25, the lower die 23, and the pressure punch 28 which passes through the upper die 25 to be inserted into the cavity 22 which is formed by the upper and lower dies 23, 25. Moreover, the passage 53 is defined on the sliding surface between the pressure punch 28 and the upper die 25.

Accordingly, the passage 53 for discharging the resin which overflows from the cavity 22 is so constructed as to communicate with an inner peripheral edge of the resin piston at a distal end side thereof. As the results, it is possible to reliably prevent occurrence of burr on the outer circumferential surface of the piston.

Moreover, the sliding surface of the pressure punch 28 is the inner circumferential surface of the punch passing hole 46 in the upper die through which the pressure punch 28 is passed. Therefore, it is possible to easily secure the passage 53 for discharging the superfluous resin, only by setting the fit tolerance in clearance fit between the pressure punch 28 and the punch passing hole 46.

It is also possible to secure the passage 53 not only by setting the fitting tolerance, but also by forming grooves or the like on the sliding surface of either one of the punch passing hole 46 and the pressure punch 28. The number and shape of the grooves are optional.

In the resin piston which is produced by the molding method of the resin piston in the above described first embodiment, the burr and the gate mark as described in the prior art will not occur on the outer circumferential surface of the piston where high dimensional accuracy and a smooth surface are required for sliding movement with respect to the cylinder. As the results, it becomes unnecessary to apply additional works such as removal of the burr and removal of the gate mark to the outer circumferential surface of the piston. Moreover, because the molding die 21 is not opened until the thermosetting cycle has finished, the dimensional accuracy of the molded product can be enhanced. Accordingly, it is possible to realize reduction of the production cost and high accuracy of the product.

FIGS. 2A to 2D are schematic views showing a series of compression molding steps in the resin piston molding method in the second embodiment according to the invention. FIG. 2A is a vertical sectional view in a state where an upper die and a lower die are opened. FIG. 2B is a vertical sectional view in a state where the upper die and the lower die are closed. FIG. 2C is a vertical sectional view in a state where a compression molding step is started by means of a pressure punch. FIG. 2D is a vertical sectional view in a state where superfluous resin material is discharged to the outside, while an internal pressure is maintained within a determined pressure range.

A molding die 21A to be used in the second embodiment is the molding die which is partly improved from the molding die 21 in the first embodiment, and the same or similar numbers are allotted to the parts which are common or corresponding to the molding die 21.

The molding die 21A includes a lower die 23A having a cavity 22 for molding, an upper die 25A which is provided above the lower die 23A so as to move up and down and adapted to close the cavity 22, a pressure regulating pin 55 which is detachably provided on a lower surface of the lower die 23A, a pressure punch 28 which passes through the upper die 25A in such a manner that a distal end thereof can enter into the cavity 22, and an ejector pin (not shown) for taking out a molded product from the cavity 22.

Moreover, the molding die 21A is provided with heating means (not shown) for heating the molds to a predetermined temperature for thermosetting process.

The lower die 23A is formed as a block body which is open at its upper end having the cavity 22 formed therein.

A pressure regulating hole 31 into which the pressure regulating pin 55 is detachably fitted is formed through a center part of this block body. The pressure regulating hole 31 communicates with the cavity 22, and it is possible to adjust a sectional area of a passage communicating with the cavity 22, by adjusting an engaged state of the pressure regulating pin 55.

In case of this embodiment, the pressure regulating hole 31 can be kept closed by the pressure regulating pin 55. In a state where an opening degree is appropriately adjusted by the pressure regulating pin 55, as shown in FIG. 2D, the pressure regulating hole 31 functions as a passage 53A for discharging superfluous resin material, on occasion of compression molding or in thermosetting cycle using the molding die 21A. Therefore, in this embodiment, the molding die 21A is so constructed that the passage for discharging the superfluous resin material to the outside of the molding die 21A, on occasion of the compression molding or in the thermosetting cycle, is provided on a lower surface which functions as a hydraulic pressure acting surface of the resin piston to be molded in the cavity 22.

The pressure regulating hole 31 also functions as a knock-out hole for inserting an ejector pin (not shown), in a state where the pressure regulating pin 55 is detached.

The upper die 25A is formed as a block body which is pressed onto the lower die 23A thereby to close the cavity 22.

The upper die 25A is fitted to a punch mounting plate 44 which is separated upward from the upper die 25A by a distance L, as shown in FIG. 2A, by way of a movable support member 45 which applies elasticity to the punch mounting plate 44. The movable support member 45 is a member for elastically support the upper die 25A so as to be displaced in a direction separating from the punch mounting plate 44. For example, a compression spring or an actuator such as an air cylinder may be used as the movable support member 45.

The punch mounting plate 44 is supported by a press mechanism, which is not shown, so as to move up and down with respect to the lower die 23A. Therefore, in the molding die 21A in this embodiment, the upper die 25A moves up and down along with the upward and downward movements of the punch mounting plate 44 by operation of the press mechanism.

After a lower surface of the upper die 25A comes into tight contact with an upper surface of the lower die 23A by the downward movement of the punch mounting plate 44, and the cavity 22 is brought into a closed state, the punch mounting plate 44 can further move downward according to an amount reduced from the original separation distance L between the upper die 25A and the punch mounting plate 44.

On this occasion, the separation distance between the upper die 25A and the punch mounting plate 44 is gradually reduced along with the downward movement of the punch mounting plate 44. However, because the movable support member 45 presses the upper die 25A against the lower die 23A, a determined tight contact pressure is maintained between the upper die 25A and the lower die 23A. The tight contact pressure acts as a force for closing the molds.

The pressure punch 28 is passed through the upper die 25A, and assembled to the punch mounting plate 44 in a fixed manner. In an initial state of this assembly, the original separation distance L is secured between the upper die 25A and the punch mounting plate 44, as shown in FIG. 2A, and a distal end surface of the pressure punch 28 protrudes from the lower surface of the upper die 25A by a certain length.

Moreover, in a state where the separation distance between the upper die 25A and the punch mounting plate 44 is reduced by compression of the movable support member 45, as shown in FIG. 2D, the distal end surface of the pressure punch 28 remarkably protrudes from the lower surface of the upper die 25A, and the protruding distal end part enters into the cavity 22. The distal end part of the pressure punch 28 which has entered into the cavity 22 compresses a resin tablet 63 in the cavity 22. Specifically, the separation distance L between the upper die 25A and the punch mounting plate 44 is set as an equivalent to a pressurizing margin to be pressurized by the pressure punch 28.

Although a specific mechanism is not shown, the separation distance L between the upper die 25A and the punch mounting plate 44 can be adjusted according to property of the resin material, a shape of the molded product, etc. In the same manner, an opening degree of the pressure regulating pin 55 can be adjusted according to property of the resin material, the shape of the molded product, etc. Desired number of the pressure regulating pins 55 can be provided at desired positions on the lower surface of the lower die 23A.

The ejector pin (not shown) is positioned below the lower die 23A so as to move up and down. In a state where the molding die 21A is opened and the pressure regulating pin 55 is detached from the lower surface of the lower die 23A, after the thermosetting cycle has finished, the ejector pin is inserted into the pressure regulating hole 31 which serves also as the knockout hole, thereby to push the molded product upward from the cavity 22.

Then, a method for molding the resin piston using the above described molding die 21A will be described.

The pressure regulating hole 31 of the lower die 23A is kept closed by the pressure regulating pin 55 in advance, and a preheated resin tablet (a block of the resin material) 63 is charged into the cavity 22 of the lower die 23A, as shown in FIG. 2A. Then, the upper die 25A is moved downward to close the cavity 22, as shown in FIG. 2B.

Then, in a state where the upper die 25A is pressed against the lower die 23A by an urging force of the movable support member 45, as shown in FIG. 2C, the punch mounting plate 44 is moved downward to insert the pressure punch 28 into the cavity 22 in the molding die 21A which is kept warm by heating to a predetermined temperature in advance, and thus, the compression molding is started.

When the pressure punch 28 is inserted into the cavity 22, the pressure in the cavity 22 is gradually increased, as the pressure punch 28 proceeds into the cavity 22. Therefore, the pressure regulating pin 55 is adjusted to slightly open the pressure regulating hole 31, as shown in FIG. 2D, thereby to secure the passage 53A for discharging the superfluous rein material.

When the punch mounting plate 44 is moved downward up to a prescribed pushing position, and the pressure punch 28 is inserted into the cavity 22 up to a final molding position, pressurization by a determined pressurizing margin is completed in the cavity 22, and the internal pressure of the cavity arrives at the determined pressure. At this arrival at the determined pressure, the resin material is completely filled in the cavity 22.

Moreover, at a time point when the internal pressure of the cavity has arrived at the determined pressure, the thermosetting process is carried out keeping the temperature of the molding die 21A to the temperature required for thermosetting the resin material, while the internal pressure of the cavity is kept within the determined pressure range. During this thermosetting process, the superfluous resin material 64 is guided out to the outside from the passage 53A which is provided on the lower surface which functions as the hydraulic pressure acting surface of the resin piston as the molded product, and packing density in the cavity 22 is adjusted to the packing density which has been set.

After the thermosetting process (thermosetting cycle) has finished, the molding die 21A is opened, and the ejector pin, which is not shown, is inserted into the pressure regulating hole 31 in the lower die 23A thereby to take out the molded product from the cavity 22.

In the method for molding the resin piston as described above, the resin which overflows from the cavity 22 of the molding die 21A during the compression molding step is discharged from the passage 53A which is provided in an area except an outer circumferential surface of the piston. Accordingly, there is no burr formed by the resin which is discharged, on the outer circumferential surface of the piston which is in sliding contact with a cylinder. Besides, because an injection gate is not used in charging the material into the cavity 22, a gate mark will not occur.

Therefore, it becomes unnecessary to apply additional works such as removal of the burr, removal of the gate mark, to the outer circumferential surface of the piston. Further, in the course of the compression molding step before the internal pressure of the molding die 21A arrives at the determined pressure, the passage 53A for discharging the superfluous material by means of the pressure regulating pin 55 can be kept in a closed state, and hence, it is also possible to decrease the waste resin material.

Moreover, because the molding die 21A is opened after the thermosetting cycle has finished, dispersion in size hardly occurs in the molded products, and stabilized products having high dimensional accuracy can be obtained.

Specifically describing, in the method for molding the resin piston in the above described second embodiment, the molding die 21A is provided with at least the upper die 25A, the lower die 23A, and the pressure punch 28 which passes through the upper die 25A to be inserted into the cavity 22 which is formed by the upper and lower dies 23A, 25A. Moreover, the passage 53A is defined on the lower surface which functions as the hydraulic pressure acting surface of the resin piston.

Accordingly, the passage 53A for discharging the resin which overflows from the cavity 22 is so constructed as to communicate with the hydraulic pressure acting surface of the resin piston. As the results, it is possible to reliably prevent occurrence of burr on the outer circumferential surface of the piston.

Moreover, the passage 53A for discharging the resin which overflows from the cavity 22 serves also as the passage for inserting the ejector pin (not shown).

Therefore, a passage exclusively for discharging the resin is not formed in the molding die 21A, and hence, it is possible to prevent complication of the structure of the molding die 21A.

It is to be noted that the method for molding the resin piston and the resin piston according to the invention are not limited to the above described embodiments, but appropriate modifications, improvements and so on can be made.

For example, it is also possible to provide the passage for discharging the superfluous resin material during the compression molding or the thermosetting molding in other areas than the area mentioned in the above described embodiments, excluding the outer circumferential surface of the piston.

Moreover, the art field to which the invention can be applied is not limited to a field of vehicles, but the invention can be applied to different art field, provided that it has the same technical concept.

What is claimed is:

1. A method for molding a resin piston by charging a preheated resin tablet into a cavity of a molding die, and by compression molding the resin tablet while heating, the method comprising:
    a step for discharging superfluous resin out of the molding die which overflows from the molding die, from a passage which is defined in an area other than an outer circumferential surface of the resin piston, while maintaining an internal pressure of the cavity, when a pressurizing margin in the molding die is pressurized and the internal pressure of the cavity arrives at a setting pressure; and
    a step for opening the molding die, after a thermosetting cycle is finished,
    wherein a diameter of the passage increases outwardly from the cavity,
    the molding die includes at least an upper die, a lower die, and a pressure punch,
    the pressure punch is configured to pass through a punch passing hole formed in the upper die, so as to be fitted into the cavity which is formed by the upper die and the lower die,
    a diameter of an inner surface of the punch passing hole at the lower end thereof is smaller than an inner diameter of the cavity by a thickness of the resin piston, and
    the passage is defined between the inner surface of the punch passing hole and an outer surface of the pressure punch.

2. The method for molding a resin piston as claimed in claim 1, wherein an outer diameter of the passage is set to be a size equal to the diameter of the punch passing hole at a lower end of the passage, and is set to be larger than the outer diameter of the punch passing hole at an upper end of the passage so as to define a space having a size for storing the resin which flows from a gap between the inner surface of the punch passing hole at the lower end thereof and the pressure punch.

\* \* \* \* \*